(12) United States Patent
Ham

(10) Patent No.: US 7,691,194 B2
(45) Date of Patent: Apr. 6, 2010

(54) SELF-DISPERSIBLE COLORANTS, METHOD OF PREPARING THE SAME AND INK COMPOSITION COMPRISING THE COLORANTS

(75) Inventor: Cheol Ham, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1133 days.

(21) Appl. No.: 11/250,413

(22) Filed: Oct. 17, 2005

(65) Prior Publication Data

US 2006/0112853 A1 Jun. 1, 2006

(30) Foreign Application Priority Data

Nov. 27, 2004 (KR) ................. 10-2004-0098360

(51) Int. Cl.
*C09D 11/00* (2006.01)
*C08K 5/00* (2006.01)

(52) U.S. Cl. .............. 106/31.78; 106/31.27; 106/31.43; 106/31.46; 106/31.47; 106/31.49; 106/31.6; 106/31.76; 106/31.77; 106/493; 106/499

(58) Field of Classification Search .............. 106/31.27, 106/31.43, 31.46, 31.47, 31.49, 31.6, 31.76, 106/31.77, 31.78, 493, 499
See application file for complete search history.

(56) References Cited

U.S. PATENT DOCUMENTS

| 6,468,340 | B1 | 10/2002 | Moffatt et al. |
| 6,533,859 | B2 | 3/2003 | Lamba et al. |
| 6,699,319 | B2 | 3/2004 | Adams et al. |
| 2005/0066856 | A1* | 3/2005 | Lee et al. ................... 106/493 |

FOREIGN PATENT DOCUMENTS

| JP | 8-337737 | 12/1996 |
| JP | 2000-169769 | 6/2000 |
| JP | 2001-89688 | 4/2001 |
| KR | 2002-0033128 | 5/2002 |

* cited by examiner

*Primary Examiner*—Anthony J Green
*Assistant Examiner*—Pegah Parvini
(74) *Attorney, Agent, or Firm*—Roylance, Abrams, Berdo & Goodman, L.L.P.

(57) ABSTRACT

A self-dispersible colorant has a hydrophilic group incorporated into a colorant. A method of preparing the self-dispersible colorant reacts a cyclic anhydride with a reactive colorant in the presence of a Lewis acid. An ink composition comprising the self-dispersible colorant provides long-term storage stability and dispersion stability.

11 Claims, No Drawings

SELF-DISPERSIBLE COLORANTS, METHOD OF PREPARING THE SAME AND INK COMPOSITION COMPRISING THE COLORANTS

CROSS-REFERENCE TO RELATED PATENT APPLICATION

This application claims the benefit of Korean Patent Application No. 10-2004-0098360, filed on Nov. 27, 2004, in the Korean Intellectual Property Office, the disclosure of which is incorporated by reference herein in its entirety.

BACKGROUND OF THE INVENTION

1. Field of the Invention

The present invention relates to a self-dispersible colorant by incorporating hydrophilic groups into a colorant, a method of preparing the colorant and to an ink composition comprising the colorant. More specifically, the invention is directed to a self-dispersible colorant that has excellent dispersibility in aqueous solvents even without the use of other dispersants. The invention is also directed to a method of preparing the colorant and an ink composition comprising the colorant.

2. Description of the Related Art

In general, colorants embody their inherent colors by selectively absorbing or reflecting visible light, and are classified as dyestuffs and pigments.

Dyestuffs which are dissolved in solvents, are dyed in any materials to be dyed, such as fibers, leathers, furs, papers, etc., thereby providing fastness to daylight, washing, friction, etc. Pigments which are insoluble to solvents, are coloring matters in the form of particulates, and are not directly dyed on the surface of the material to be dyed but are adhered to the surface of the material to be dyed, by physical means (e.g., adhesion, etc.), thereby providing their inherent colors.

In preparing pigment-type inks, an operation of dispersing a pigment in a solvent should be basically carried out. Herein, the size of pigment particles, the distribution of its particle size and its dispersion stability are important factors influencing on efficient dispersion of the pigment. Even if the pigment particles dispersed through the dispersing step described above are stored for long term or are exposed to the change of environmental factors such as change of temperature, aggregation or precipitation of the pigment particles should not occur.

Most of pigment-type black ink uses a carbon black as a colorant. A method for dispersing a carbon black in an aqueous solvent for ink using a dispersant includes a dispersing method using a styrene-maleic acid anhydride copolymer as disclosed in U.S. Pat. No. 3,687,887. Alternative dispersing methods use a hydrophobic polymer dispersant containing a hydrophilic group such as a carboxylic acid, a sulfonic acid or a sulfate as disclosed in U.S. Pat. No. 4,697,794. A random copolymer that contains a hydrophilic group by incorporating a carboxylic acid is used as a dispersant as disclosed in U.S. Pat. Nos. 5,229,786; 5,172,133; 5,160,370; 5,184,148; or 5,106,417, as well as others. Also, U.S. Pat. Nos. 5,085,698 and 5,221,334 disclose an AB-type block copolymer or a BAB-type block copolymer (herein, A is a hydrophilic monomer and B is a hydrophobic monomer) in which a hydrophilic monomer and a hydrophobic monomer are used, as a dispersant, and U.S. Pat. No. 5,589,522 used a graft polymer and U.S. Pat. Nos. 4,959,661 and 5,125,968 disclose a known emulsifier to enhance the dispersibility of a pigment.

When using a dispersant in order to disperse a carbon black, the dispersant is easily available since conventional dispersants can be used. However, when using a water-soluble dispersant in order to disperse a carbon black pigment in an aqueous solvent, the water-soluble dispersant can be adsorbed physically to the surfaces of carbon black. The dispersing effect of the pigment can be obtained only with an excessive amount of the dispersant. Thus, since an excessive water-soluble dispersant must be used compared to the amount of the pigment to be dispersed, overall dispersion efficiency is decreased. Since the dispersant does not bind to the pigment efficiently and stably, the dispersion stability becomes poor. Thus, when preparing ink by using the dispersant, long-term storage stability is decreased such that insoluble particles in the ink are prone to aggregation or precipitation.

When a block copolymer and a graft copolymer are used as a dispersant, the cost for preparing the dispersant is high. When using a general emulsifier, excessive foam may occur during the dispersion process.

To solve the problem occurred by use of such a dispersant and an emulsifier, a method of enhancing the dispersibility of a carbon black by surface modification was designed. U.S. Pat. Nos. 5,630,868 and 5,672,198 disclose a method of modifying a carbon black pigment to a self-dispersible pigment by incorporating a hydrophilic group into the surface of the carbon black through a reaction of the carbon black pigment with a diazonium salt.

However, according to the method disclosed in these patents, an aromatic amine is necessarily required in the terminal end of a compound that contains a hydrophilic group and reacts with a pigment to transport the hydrophilic group to the pigment. However, such hydrophilic group-containing aromatic amine compounds are difficult to obtain commercially, and the aromatic amine compound should be reacted with a carbon black after converting the compound to a diazonium salt. Thus, a plurality of reaction processes, not a single process, are required and so the complexity of the process and the cost of the process are increased.

SUMMARY OF THE INVENTION

The present invention provides a self-dispersible colorant which is easily dispersed in an aqueous solvent, etc. without using a separate dispersant. The resulting colorant has superior long term storage stability and dispersion stability. The colorant also has a number of improved characteristics, such as the ability to embody a color, durability, light resistance, and the like.

The present invention also provides a method of preparing the self-dispersible colorant in a single process.

The present invention also provides an ink composition, a paint and a toner composition including the self-dispersible colorant.

The present invention provides a self-dispersible colorant represented by the Formula I below.

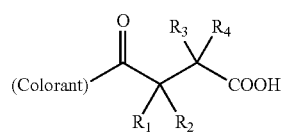

I

In the Formula I, $R_1$, $R_2$, $R_3$, and $R_4$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_3$-$C_{20}$ heteroaryl group, a $C_2$-$C_{12}$ alkenyl group, a substituted or unsubstituted $C_7$-$C_{20}$ arylalkyl group, a halogen, $NO_2$, CN, a $C_1$-$C_6$ alkoxy group; $R_1$ and $R_2$ together form $R_5$—($R_6$—)C=, wherein $R_5$ and $R_6$ are each a hydrogen atom or a $C_1$-$C_4$ alkyl group; $R_2$ and $R_3$ can form a bond together, $R_1$ and $R_4$ together form a $C_2$ to $C_{15}$ cyclic or heterocyclic group.

According to an embodiment of the present invention, the colorant may include a $C_6$-$C_{15}$ aryl group or a $C_2$-$C_{15}$ heteroaryl group.

According to another embodiment of the present invention, the colorant may include a ring of a benzene, a naphthalene, a pyridine, a furan, a thiophene or a pyrole.

The present invention also provides a method of preparing a self-dispersible colorant represented by the Formula I comprising the step of reacting cyclic anhydrides represented by Formula II below with a colorant in the presence of a Lewis acid.

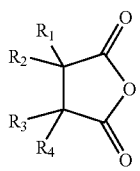

II

In the Formula II,
$R_1$, $R_2$, $R_3$, and $R_4$ are the same as defined in the formula I.

According to an embodiment of the present invention, the cyclic anhydride represented by the Formula II may be any of the compounds represented by the formulae below:

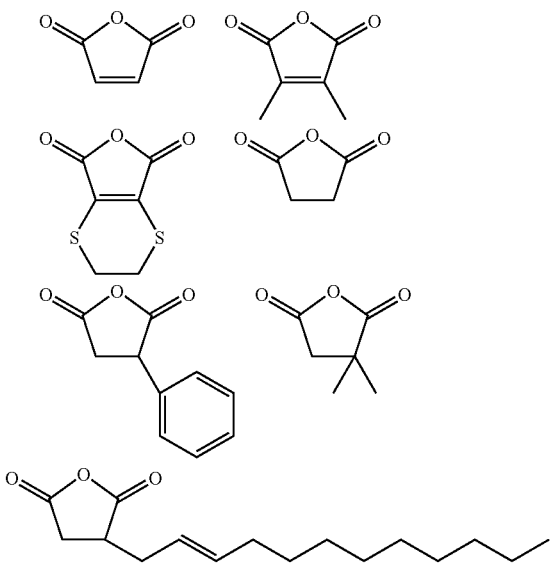

According to another embodiment of the present invention, the Lewis acid may be $AlCl_3$, $FeCl_3$, $FeBr_3$, $SnCl_4$, $SbCl_5$, $ZnCl_2$, $BF_3$ or $TiCl_4$.

According to yet another embodiment of the present invention, the cyclic anhydride is reacted in an amount of 10 to 200 parts by weight based on 100 parts by weight of a colorant.

According to still yet another embodiment of the present invention, the preparation method is carried out at a temperature of 60 to 200° C.

The present invention also provides an ink composition, a paint or a toner composition comprising the self-dispersible colorant according to the Formula I.

According to an embodiment of the present invention, the ink composition comprises 500 to 5,000 parts by weight of water or a mixture comprising water and at least one organic solvent as an aqueous solvent based on 100 parts by weight of the self-dispersible colorant.

According to another embodiment of the present invention, the ink composition further comprises a surfactant, a viscosity controller, an acid or a base.

A self-dispersible colorant according to the present invention has excellent dispersibility in an aqueous solvent without using a separate dispersant by incorporating a hydrophilic group into a colorant. The colorant has not only superior long term storage stability and dispersion stability, but also the ability to embody a color, durability, light resistance, and can be simply prepared even in a single process. A pigment composition, a paint and a toner composition including the same have superior long-term storage stability and do not exhibit aggregation of pigment particles.

DETAILED DESCRIPTION OF THE INVENTION

The present invention will now be described more fully hereinafter with reference to the preferred embodiments of the invention. This invention may, however, be embodied in many different forms and should not be construed as being limited to the embodiments set forth herein. Rather, these embodiments are provided so that this disclosure will be thorough and complete, and will fully convey the scope of the invention to those skilled in the art.

A self-dispersible colorant according to the present invention can be represented by the Formula I below, which a hydrophilic group is incorporated into a colorant:

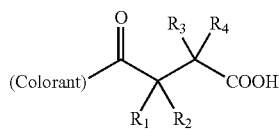

I

In the Formula I,
$R_1$, $R_2$, $R_3$, and $R_4$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_3$-$C_{20}$ heteroaryl group, a $C_2$-$C_{12}$ alkenyl group, a substituted or unsubstituted $C_7$-$C_{20}$ arylalkyl group, a halogen, $NO_2$, CN, a $C_1$-$C_6$ alkoxy group; $R_1$ and $R_2$ form together $R_5$—($R_6$—)C=, wherein $R_5$ and $R_6$ are each a hydrogen atom or a $C_1$-$C_4$ alkyl group; $R_2$ and $R_3$ can form a bond together, $R_1$ and $R_4$ form together a $C_2$ to $C_{15}$ cyclic or heterocyclic group.

The unsubstituted $C_1$-$C_{20}$ alkyl group specifically includes methyl, ethyl, propyl, isobutyl, sec-butyl, pentyl, iso-amyl, hexyl, etc. At least one hydrogen in the alkyl can be substituted with a halogen atom, a hydroxy group, a cyano group, an amino group, an amid group, a hydrazine, a hydrazone, a carboxylic acid or a salt thereof, a sulfonic acid or a salt thereof, a phosphoric acid or a salt thereof, or a $C_1$-$C_{20}$ alkyl, alkenyl, alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

The aryl group refers to a $C_6$-$C_{20}$ aromatic system containing at least one ring which can be attached or fused together to form a pendant group. The term "aryl" refers to an aromatic radical such as phenyl, naphthyl, and tetrahydronaphthyl. The aryl group may have a substituent such as a haloalkylene, a nitro, a cyano, an alkoxy and a lower alkylamino group. Further, at least one hydrogen atom in the aryl group may be substituted with the same substituent as in the alkyl group described above.

The heteroaryl group refers to a univalent monocyclic or bicyclic aromatic bivalent organic group in which 1, 2 or 3 hetero atoms selected from the group consisting of N, O, P and S are included. The other atoms in the ring are C. The ring is a 4~24 membered ring. At least one hydrogen atom in the heteroaryl group can be substituted with the same substituent as in the alkyl group.

The arylalkyl group refers to a substituent in which an aryl or heteroaryl group as described above is included in the ends of a $C_2$-$C_{14}$ alkyl group. Herein, at least one hydrogen atom in the alkyl, aryl or heteroaryl group can be substituted with the same substituent as in the alkyl group.

The self-dispersible colorant represented by the Formula I is in the form that hydrophilic carboxylic group is incorporated on the surface of the colorant. The hydrophilic group is electrostatically interacted with an aqueous medium after being incorporated into a pigment such that the pigment containing the hydrophilic group can be easily dispersed in the aqueous medium without comprising any separate dispersant.

The colorant can be any suitable colorant material or compound that is capable of reacting with the cyclic anhydride of Formula II as discussed hereinafter. A colorant constituting the self-dispersible colorant may comprise a $C_6$-$C_{15}$ aryl group or a $C_3$-$C_{15}$ heteroaryl group, and specifically comprise rings of a benzene, a naphthalene, a pyridine, a furane, a thiophene or a pyrrole.

The specific examples of the colorant include, but are not limited to, a carbon black, a graphite, a vitreous carbon, an activated charcoal, an activated carbon, an anthraquinone, a phthalocyanine blue, a phthalocyanine green, diazos, monoazos, pyranthrones, a phenylene, a quinacridone, indigoid pigments, etc.

The self-dispersible colorant represented by the Formula I according to the present invention can be prepared by a method comprising an operation of reacting a cyclic anhydride represented by Formula II below with a colorant in the presence of a Lewis acid:

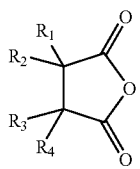

II

In the Formula II, $R_1$, $R_2$, $R_3$, and $R_4$ are the same as defined in the Formula I.

The cyclic anhydride may be reacted in an amount of 10 to 200 parts by weight based on 100 parts by weight of a colorant. When the amount of the anhydride is less than 10 parts by weight, it is difficult to obtain self-dispersion effect by a substituent. When the amount exceeds 200 parts by weight, the physical properties may be deteriorated in preparing an ink by unreacted cyclic anhydride.

Among the cyclic anhydride represented by the Formula II used in a method according to the present invention, anhydrides represented by the formulae below are particularly preferred, and these anhydrides turned out to be effective in preparing a self-dispersible carbon black pigment:

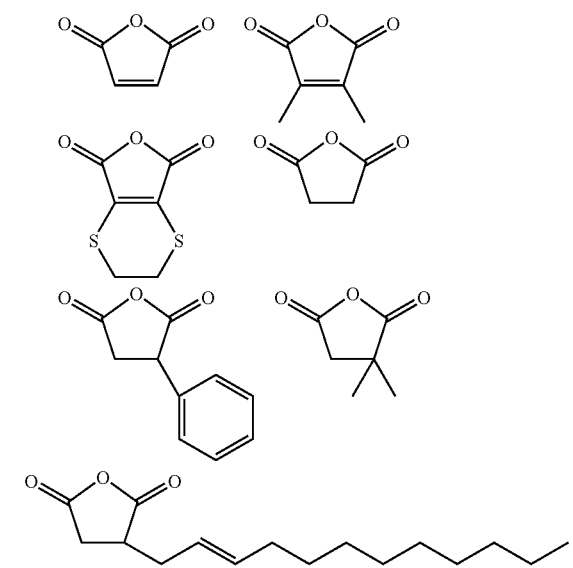

A Lewis acid used in preparing a self-dispersible colorant according to the present invention is a compound, which shares an atom including an unshared electron pair, thereby forming a covalent bond. Non-limiting examples of suitable Lewis acids include $AlCl_3$, $FeCl_3$, $FeBr_3$, $SnCl_4$, $SbCl_5$, $ZnCl_2$, $BF_3$, $TiCl_4$.

The temperature used in preparing the self-dispersible colorant according to the present invention depends on the classes of the colorant, the cyclic anhydride, and the aqueous solvent, but can be in the range of 60° C. to 200° C. The reaction for preparing the self-dispersible colorant according to the present invention depends on the boiling point of each solvent used since the reaction proceeds under reflux conditions for the solvent.

The hydrophilic group is incorporated into the self-dispersible colorant prepared according to an embodiment of the present invention through a simplified one step process described above. Thus, such a self-dispersible colorant can be widely used in not only fibers, leathers, furs, papers, foods, medicines, cosmetics, compositions for ink-jet inks, compositions for printing inks, paints, toner compositions, but also for the coloration of plastics or rubbers, furniture manufacturing, textile printing, paper manufacturing, cosmetics manufacturing, ceramic industry, etc.

The ink composition according to the present invention uses an aqueous solvent. The aqueous solvent can be water alone, or water in combination with at least one organic solvent to control viscosity and surface tension of the ink composition in a proper range. The ink composition comprises 500 to 5,000 parts by weight of the aqueous solvent, and may comprise 1,000 to 3,000 parts by weight of the aqueous solvent based on 100 parts by weight of the self-dispersible colorant. When the amount of the aqueous solvent is less than 500 parts by weight, a colorant is prone to aggregation since its dispersion is not satisfactory. When the amount of the aqueous solvent exceeds 5,000 parts by weight, the amount of a colorant is too little to embody the desired color.

Those skilled in the art can determine routinely the amount of the organic solvent such that a self-dispersible colorant according to the present invention can be dispersed in the aqueous solvent effectively. However, 10 to 1,000 parts by weight of the organic solvent based on 100 parts by weight of the self-dispersible colorant may be used. The organic solvent includes, but is not limited to, hydrocarbon solvents selected from the group consisting of alcohols such as methyl alcohol, ethyl alcohol, n-propyl alcohol, isopropyl alcohol, n-butyl alcohol, sec-butyl alcohol, t-butyl alcohol, isobutyl alcohol, etc.; ketones such as acetone, methylethylketone, diacetone alcohol, etc.; esters such as ethyl acetate, ethyl lactate, etc.; polyhydric alcohols such as ethyleneglycol, diethyleneglycol, triethyleneglycol, propyleneglycol, butyleneglycol, 1,4-butanediol, 1,2,4-butanetriol, 1,5-pentanediol, 1,2-hexanediol, 1,6-hexanediol, 1,2,6-hexanetriol, hexyleneglycol, glycerol, glycerol ethoxylate, trimethylolpropane ethoxylate, etc.; lower alkyl ethers such as ethyleneglycol monomethyl ether, ethyleneglycol monoethyl ether, diethyleneglycol methyl ether, diethyleneglycol ethyl ether, triethyleneglycol monomethyl ether, triethyleneglycol monoethyl ether, etc.; N-containing compounds such as 2-pyrrolidone, N-methyl-2-pyrrolidone, caprolactam, etc; dimethyl sulfoxide, tetramethylene sulfone, thioglycol, etc.

The ink composition of an embodiment of the present invention can further comprise additives such as a surfactant, a viscosity controller, a metal oxide, or an acid or a base, etc.

The surfactant that can be included in the composition according to the present invention controls the surface tension of the composition to stabilize jetting at the nozzle of an ink jet printer. The surfactant can be an anionic surfactant or a nonionic surfactant.

A nonionic surfactant refers to a surfactant that is not ionized when dissolved in water. An anionic surfactant refers to a surfactant of which an anionic group ionized in water generally provides activity at an interface.

The nonionic surfactant includes, but is not limited to, a polymeric active agent synthesized by block polymerization or graft polymerization of a hydrophilic unit with a hydrophobic unit such as a polyoxyethylene alkylether, a polyoxyethylene fatty acid ester, a polyoxyethylene alkyl phenolether, a sorbitan fatty acid ester, a polyoxyethylene sorbitan fatty acid ester or a sucrose fatty acid ester, etc.

The ink composition includes, in general level, 0.1 to 5.0 parts by weight of a surfactant, based on 100 parts by weight of the ink composition.

A viscosity controller controls the viscosity to maintain smooth jetting. The viscosity controller can be selected from the group consisting of polyvinyl alcohol, casein, and carboxymethyl cellulose, as well as others. Those skilled in the art can determine easily the amount of the viscosity controller depending on the characteristics of the ink composition according to the present invention. However, the ink composition typically includes 0.1 to 5.0 parts by weight of a viscosity controller based on 100 parts by weight of the ink composition.

The ink composition according to the present invention may further comprise acids or bases. The acids or bases stabilize a pigment against a solvent. The ink composition may include 0.1 to 20 parts by weight of an acid or a base based on 100 parts by weight of the ink composition.

A method for preparing the ink composition having the component ratio described above is performed as follows.

First, a self-dispersing colorant, a surfactant and a viscosity controller, etc. are added to an aqueous solvent and then mixed. Then the mixture is sufficiently stirred to a homogeneous state. Thereafter the mixture is filtered through a filter to obtain the ink composition according to an embodiment of the present invention.

The present invention will be described in greater detail with reference to the following examples. The following examples are for illustrative purposes and are not intended to limit the scope of the invention.

In these examples, the embodiments of the present invention are evaluated with respect to their characteristics in ink, and these evaluation methods can also be applied to wet toners, dry toners, paints and/or coating liquids, in addition to ink. Hereinafter, only an ink composition is described as representative of the examples about the ink composition in which the self-dispersible colorant are comprised. The present invention is not limited to an ink composition.

EXAMPLES

Preparation Example 1

Preparation of a Self-dispersible Carbon Black Pigment by Employing a Maleic Anhydride

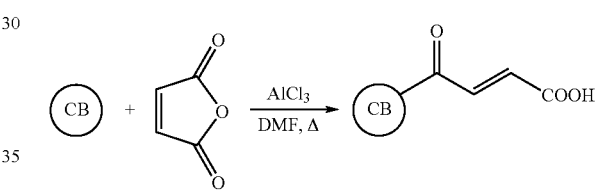

Reaction Scheme I

In the reaction scheme, "CB" refers to a carbon black pigment.

According to the Reaction Scheme I, 40.8 g of a carbon black pigment (FW-200, manufactured by Degussa Co.), 37.8 g of a maleic anhydride, 23.4 g of AlCl₃ and 400 ml of DMF were placed into a 1 liter round bottom flask and reacted by refluxing by heating for 6 hours. The reaction flask was dipped into ice water to cool down, and 400 ml of water was added to hydrolyze the reaction product. 100 ml of concentrated HCl was added thereto and the flask was further stirred for 40 minutes. The solid product was filtered and washed with 200 ml of 2N HCl aqueous solution and 200 ml of water. The solid product in wet state was dispersed again in 400 ml of water, was desalted through a reverse osmotic membrane, and was concentrated to obtain 55.3 g of the self-dispersible carbon black pigment of the Reaction Scheme I.

Preparation Example 2

Preparation of a Self-dispersible Carbon Black Pigment Employing 2,3-dimethylmaleic Anhydride 41.2 g of a carbon black pigment (Regal 330, manufactured by Cabot Co.), 36.4 g of 2,3-dimethylmaleic anhydride, 27.2 g of FeCl₃ and 400 ml of DMF were placed into a 1 liter round bottom flask and reacted by refluxing by heating for 6 hours. The reaction flask was dipped into ice water to cool down, and 400 ml of water was added to hydrolyze the reaction product. 100 ml of concentrated HCl was added thereto and the flask was further stirred for 40 minutes. The solid product was filtered and washed with 200 ml of 2N HCl aqueous solution and 200 ml of water. The solid product in wet state was dispersed again in 400 ml of water, was desalted through a reverse osmotic membrane, and was concentrated to obtain 53.6 g of the self-dispersible carbon black pigment.

Preparation Example 3

Preparation of a Self-dispersible Carbon Black Pigment Employing 2,3-dihydro-1,4-dithiino[2,3-c]furan-5,7-dione 41.6 g of a carbon black pigment (Raven 5250, manufactured by Columbian Co.), 34.7 g of 2,3-dihydro-1,4-dithiino[2,3-c]furan-5,7-dione, 32.7 g of $FeBr_3$ and 400 ml of DMF were placed into a 1 liter round bottom flask and reacted by refluxing by heating for 7 hours. The reaction flask was dipped into ice water to cool down, and 400 ml of water was added to hydrolyze the reaction product. 100 ml of concentrated HCl was added thereto and the flask was further stirred for 40 minutes. The solid product was filtered and washed with 200 ml of 2N HCl aqueous solution and 200 ml of water. The solid product in wet state was dispersed again in 400 ml of water, was desalted through a reverse osmotic membrane, and was concentrated to obtain 55.2 g of the self-dispersible carbon black pigment.

Preparation Example 4

Preparation of a Self-dispersible Carbon Black Pigment Employing a Succinic Anhydride 40.0 g of a carbon black pigment (No. 25B, manufactured by Mitsubishi Co.), 30.9 g of a succinic anhydride, 27.6 g of $ZnCl_2$ and 400 ml of DMSO were placed into a 1 liter round bottom flask and reacted by refluxing by heating for 5 hours. The reaction flask was dipped into ice water to cool down, and 400 ml of water was added to hydrolyze the reaction product. 100 ml of concentrated HCl was added thereto and the flask was further stirred for 40 minutes. The solid product was filtered and washed with 200 ml of 2N HCl aqueous solution and 200 ml of water. The solid product in wet state was dispersed again in 400 ml of water, was desalted through a reverse osmotic membrane, and was concentrated to obtain 55.4 g of the self-dispersible carbon black pigment.

Preparation Example 5

Preparation of a Self-dispensible Carbon Black Pigment Employing a Phenyl Succinic Anhydride 41.2 g of a carbon black pigment (No. 258, manufactured by Mitsubishi Co.), 34.5 g of a phenyl succinic anhydride, 31.2 g of $SnCl_4$ and 400 ml of DMSO were placed into a 1 liter round bottom flask and reacted by refluxing by heating for 8 hours. The reaction flask was dipped into ice water to cool down, and 400 ml of water was added to hydrolyze the reaction product. 100 ml of concentrated HCl was added thereto and the flask was further stirred for 40 minutes. The solid product was filtered and washed with 200 ml of 2N HCl aqueous solution and 200 ml of water. The solid product in wet state was dispersed again in 400 ml of water, was desalted through a reverse osmotic membrane, and was concentrated to obtain 51.3 g of the self-dispersible carbon black pigment.

Preparation Example 6

Preparation of a Self-dispersible Carbon Black Pigment Employing a 2,2-dimethylsuccinic Anhydride 40.8 g of a carbon black pigment (Valcan XC-72R, manufactured by Cabot Co.), 36.3 g of a 2,2-dimethylsuccinic anhydride, 31.8 g of $AlCl_3$ and 400 ml of DMF were placed into a 1 liter round bottom flask and reacted by refluxing by heating for 7 hours. The reaction flask was dipped into ice water to cool down, and 400 ml of water was added to hydrolyze the reaction product. 100 ml of concentrated HCl was added thereto and the flask was further stirred for 40 minutes. The solid product was filtered and washed with 200 ml of 2N HCl aqueous solution and 200 ml of water. The solid product in wet state was dispersed again in 400 ml of water, was desalted through a reverse osmotic membrane, and was concentrated to obtain 55.6 g of the self-dispersible carbon black pigment.

Preparation Example 7

Preparation of a Self-dispersible Carbon Black Pigment Employing a Dodecenylsuccinic Anhydride 40.8 g of a monoazo based dye (C.I. Disperse Red 1), 35.4 g of a dodecenylsuccinic anhydride, 23.4 g of $AlCl_3$ and 400 ml of DMF were placed into a 1 liter round bottom flask and reacted by refluxing by heating for 8 hours. The reaction flask was dipped into ice water to cool down, and 400 ml of water was added to hydrolyze the reaction product. 100 ml of concentrated HCl was added thereto and the flask was further stirred for 40 minutes. The solid product was filtered and washed with 200 ml of 2N HCl aqueous solution and 200 ml of water. The solid product in wet state was dispersed again in 400 ml of water, was desalted through a reverse osmotic membrane, and was concentrated to obtain 54.6 g of the self-dispersible carbon black pigment.

Example 1

Preparation of an Ink Composition Comprising a Self-dispersible Carbon Black Pigment The components described in Table 1 below were placed in 250 ml beaker, mixed and then stirred sufficiently for at least 30 minutes. The mixture was filtered through 0.4 μm filter to prepare an ink composition.

TABLE 1

| Components | Amount (g) |
| --- | --- |
| Self-dispersible carbon black pigment of the preparation example 1 | 4.0 |
| Water | 77.0 |
| Diethylene glycol | 3.0 |
| Ethylene glycol | 8.0 |
| Glycerin | 8.0 |

Examples 2 to 6

An ink composition was prepared according to the same method used in example 1, except that the self-dispersible carbon black pigment prepared in the preparation examples 2 to 6 was respectively used instead of the self-dispersible carbon black pigment used in Example 1.

Comparative Examples 1-6

An ink composition was prepared according to the same method used in Example 1, except that the general carbon black pigment described in Table 2 below was respectively used instead of the self-dispersible carbon black pigment used in Example 1.

TABLE 2

| Comparative Example | Carbon black used |
|---|---|
| 1 | FW-200, manufactured by Degussa Co. |
| 2 | Regal 330, manufactured by Cabot Co. |
| 3 | Raven 5250, manufactured by Columbian Co. |
| 4 | No. 25B, manufactured by Mitsubishi Co. |
| 5 | No. 258, manufactured by Mitsubishi Co. |
| 6 | Valcan XC-72R, manufactured by Cabot Co. |

The properties of the ink compositions prepared according to above Examples and Comparative Examples were evaluated according to the following Methods.

Experimental Example 1

Test of Long-term Storage Stability 100 ml of the ink compositions prepared according to the Examples 1-6 and the Comparative Examples 1-6 were respectively placed into 12 heat resistant vials; the opening of the vials was closed, and the vials were stored in an incubator at the temperature of 60° C. After remaining at this state for 2 months, it was investigated whether each ink composition placed in the vials was precipitated. The results are shown in Table 3 below.

TABLE 3

|  | Examples |  |  |  |  |  | Comparative Examples |  |  |  |  |  |
|---|---|---|---|---|---|---|---|---|---|---|---|---|
| Number | 1 | 2 | 3 | 4 | 5 | 6 | 1 | 2 | 3 | 4 | 5 | 6 |
| Evaluation | ○ | ○ | ○ | ○ | ○ | ○ | ○ | X | ○ | X | X | ○ |

○: No Precipitates.
X: Precipitates occurred.

From Table 3, it can be seen that for the ink compositions according to the present invention, precipitates were not formed even after standing for 2 months. Particularly, for the ink compositions prepared in Comparative Examples 2, 4 and 5, precipitates were observed, while for the ink compositions according to the Examples 2, 4 and 5 using the self-dispersible carbon black pigments according to the present invention in which the hydrophilic group is incorporated into the general carbon black pigments used in the Comparative Examples 2, 4 and 5, no precipitates were observed. From this result, it can be seen that the self-dispersible pigments prepared according to the present invention provided very stable long-term storage stability compared to that of the conventional pigments.

Experimental Example 2

Test of Dispersion Stability

The ink compositions prepared according to Examples 1-6 and Comparative Examples 1-6 were respectively measured for the time required when filtered under pressure at 1 μm porous membrane. Then, 50 ml of the ink compositions prepared according to Examples 1-6 and Comparative Example 1 were respectively placed into 100 ml PP bottles, and the bottles were stored for 4 hours at 60° C. and for 4 hours at −40° C. This procedure was repeated 10 times (hereinafter refer to "TC (Thermal Cycle)"), and then the time required when filtered under pressure at 1 μm porous membrane was measured. The dispersion stability parameter A of each composition was evaluated by putting time measured before TC and time measured after TC into an Equation I below, and the results are shown in Table 4 below.

$A$=[filtering time(after $TC$)−filtering time(before $TC$)]/ filtering time(before $TC$)×100(%)  Equation I

TABLE 4

|  | Examples |  |  |  |  |  | Comparative Examples |  |  |  |  |  |
|---|---|---|---|---|---|---|---|---|---|---|---|---|
| No. | 1 | 2 | 3 | 4 | 5 | 6 | 1 | 2 | 3 | 4 | 5 | 6 |
| Evaluation | ○ | ○ | ○ | ○ | ○ | ○ | ○ | Δ | X | ○ | Δ | Δ |

○: $A < 10$ (superior dispersion stability)
Δ: $10 \leq A < 20$ (medium dispersion stability)
X: $A > 20$ (poor dispersion stability)

From the Table 4, it can be seen that the ink compositions according to the present invention were dispersed without precipitation or aggregation even after TC, and thus have superior dispersion stability. Particularly, the value of parameter A for the ink compositions prepared in Comparative Examples 2, 5 and 6 is 10 to 20. The value of parameter A for the ink compositions prepared in Comparative Example 3 exceeds 20, while the value of parameter A for the ink compositions according to the Examples 2, 3, 5 and 6 using the self-dispersible carbon black pigments according to the present invention in which the hydrophilic group is incorporated into the general carbon black pigments used in the Comparative Examples 2, 3, 5 and 6 is less than 10. From this result, it can be seen that the self-dispersible pigments prepared according to the present invention provide remarkably improved dispersion stability compared to that of the conventional pigments.

Experimental Example 3

Test of Nozzle Occlusion

The ink compositions prepared according to Examples 1-6 and Comparative Examples 1-6 were placed on a Samsung ink cartridge M-50, stored at an ambient temperature (25° C.) and low temperature (−18° C.) for 2 weeks, and then the degree by which a nozzle occluded such that it could not jet an ink when printing on a general paper (Premium Copy paper, manufactured by Samsung Co.) with a printer (MJC-2400C, manufactured by Samsung Co.) was evaluated as follows. The results are shown in Table 5 below.

TABLE 5

|  | Examples |  |  |  |  |  | Comparative Examples |  |  |  |  |  |
|---|---|---|---|---|---|---|---|---|---|---|---|---|
| No. | 1 | 2 | 3 | 4 | 5 | 6 | 1 | 2 | 3 | 4 | 5 | 6 |
| Evaluation (am. Temp.) | ○ | ○ | ○ | ○ | ○ | ○ | Δ | X | ○ | Δ | ○ | ○ |
| Evaluation (low Temp.) | ○ | ○ | ○ | ○ | ○ | ○ | X | X | ○ | X | ○ | ○ |

○: The occlusion of all nozzles was not observed
Δ: The occlusion of 1 or 2 nozzles was observed
X: The occlusion of more than 3 nozzles was observed From the Table 5, it can be seen that the ink compositions according to the present invention can be used without occlusion of nozzles even after stored at an ambient temperature or low temperature. Particularly, for the ink compositions prepared in Comparative Examples 1, 2 and 4, the occlusion of 1 or 2 nozzles, or more than 3 nozzles occurred, while for the ink compositions according to the Examples 1, 2 and 4 using the self-dispersible carbon black pigments according to the present invention in which the hydrophilic group is incorporated into the general carbon black pigments used in the Comparative Examples 1, 2 and 4, the occlusion of nozzles was not observed. From this result, it can be seen that the self-dispersible pigments prepared according to the present invention provided remarkably improved long-term storage stability and dispersion stability compared to those of the conventional pigments.

The self-dispersible colorant according to the present invention can be prepared by incorporating a hydrophilic group into the colorant through a one-step process, thereby reducing the cost for preparing the self-dispersible colorant according to the present invention. The ink composition comprising the self-dispersible colorant according to the present invention provides superior long-term storage stability and dispersion stability since aggregation or precipitation does not occur in the composition without disturbing basic properties of pigments, such as durability, ability to embody a color, light resistance, etc., even after long-term storage or variation of temperature.

The self-dispersible colorant according to the present invention can be widely used as pigments in the ink composition, fibers, leathers, furs, papers, foods, medicines, cosmetics, paints, toner compositions, coloration of plastics or rubbers, furniture manufacturing, textile printing, paper manufacturing, ceramic industry, etc., and thus the operation of dispersing the colorant that should be basically carried out in the art can be greatly improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A self-dispersible colorant represented by the formula I below:

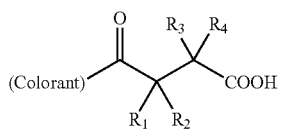

I

In the Formula I,
$R_1$, $R_2$, $R_3$, and $R_4$ are each independently a substituted or unsubstituted $C_6$-$C_{20}$ aryl group, a substituted or unsubstituted $C_3$-$C_{20}$ heteroaryl group, a $C_2$-$C_{12}$ alkenyl group, a substituted or unsubstituted $C_7$-$C_{20}$ arylalkyl group, a halogen, $NO_2$, CN, a $C_1$-$C_6$ alkoxy group; or $R_1$ and $R_2$ together form $R_5$-$(R_6$-$)C=$, wherein $R_5$ and $R_6$ are each a hydrogen atom or a $C_1$-$C_4$ alkyl group; $R_2$ and $R_3$ can form a bond together, $R_1$ and $R_4$ together form a $C_2$ to $C_{15}$ cyclic or heterocyclic group.

2. The self-dispersible colorant of claim 1, wherein the colorant of Formula I includes a $C_6$-$C_{15}$ aryl group or a $C_3$-$C_{15}$ heteroaryl group.

3. The self-dispersible colorant of claim 1, wherein the colorant of Formula I includes a benzene, a naphthalene, a pyridine, a furan, a thiophene or a pyrole ring.

4. The self-dispersible colorant of claim 1, wherein the colorant of Formula I is selected from the group consisting of carbon black, graphite, vitreous carbon, activated charcoal, activated carbon, an anthraquinone, phthalocyanine blue, phthalocyanine green, a diazo, a monoazo compound, a pyranthrone, a phenylene compound, a quinacridone, and an indigoid compound.

5. An ink composition comprising a self-dispersible colorant according to claim 1 and an aqueous solvent.

6. The ink composition of claim 5, wherein the aqueous solvent is water alone, or a mixture of water and at least one organic solvent in the amount of 500 to 5,000 parts by weight based on 100 parts by weight of the self-dispersible colorant.

7. The ink composition of claim 5, further comprising a surfactant, a viscosity controller, or an acid or a base.

8. A paint comprising a self-dispersible colorant according to claim 1.

9. A toner composition comprising a self-dispersible colorant according to claim 1.

10. A self-dispersible colorant represented by the formula I below:

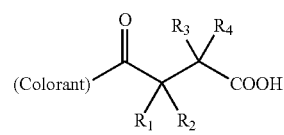

I in the Formula I,
$R_3$, and $R_4$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_3$-$C_{20}$ heteroaryl group, a $C_2$-$C_{12}$ alkenyl group, a substituted or unsubstituted $C_7$-$C_{20}$ arylalkyl group, a halogen, $NO_2$, CN, a $C_1$-$C_6$ alkoxy group; and $R_1$ and $R_2$ together form $R_5$-$(R_6$-$)C=$, wherein $R_5$ and $R_6$ are each a hydrogen atom or a $C_1$-$C_4$ alkyl group.

11. A self-dispersible colorant represented by the formula I below:

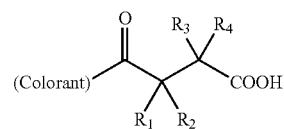

I in the Formula I,
$R_1$, and $R_4$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_3$-$C_{20}$ heteroaryl group, a $C_2$-$C_{12}$ alkenyl group, a substituted or unsubstituted $C_7$-$C_{20}$ arylalkyl group, a halogen, $NO_2$, CN, a $C_1$-$C_6$ alkoxy group, and $R_2$ and $R_3$ together form a bond.

* * * * *